(12) United States Patent
Hozumi et al.

(10) Patent No.: US 8,036,796 B2
(45) Date of Patent: Oct. 11, 2011

(54) SEAT APPARATUS FOR VEHICLE

(75) Inventors: Soichiro Hozumi, Nagoya (JP); Toshiro Maeda, Anjo (JP); Koji Aoki, Nagoya (JP); Koji Hattori, Toyota (JP); Fumiharu Ogawa, Okazaki (JP)

(73) Assignees: Aisin Seiki Kabushiki Kaisha, Kariya-shi (JP); Aisin Aw Co., Ltd., Anjo-shi (JP)

( * ) Notice: Subject to any disclaimer, the term of this patent is extended or adjusted under 35 U.S.C. 154(b) by 556 days.

(21) Appl. No.: 11/987,715

(22) Filed: Dec. 4, 2007

(65) Prior Publication Data
US 2008/0133092 A1    Jun. 5, 2008

(30) Foreign Application Priority Data
Dec. 4, 2006   (JP) ................................. 2006-327454

(51) Int. Cl.
*G06F 7/00* (2006.01)
(52) U.S. Cl. ........... 701/49; 701/37; 307/9.1; 297/284.9
(58) Field of Classification Search .............. 701/45–50; 307/8–10; 296/63, 65.01, 65.11, 65.12; 297/284.3–284.9, 452.41
See application file for complete search history.

(56) References Cited

U.S. PATENT DOCUMENTS

| | | | | |
|---|---|---|---|---|
| 6,061,627 A * | 5/2000 | Sato | ............... | 701/207 |
| 6,188,316 B1 * | 2/2001 | Matsuno et al. | .............. | 340/441 |
| 6,720,750 B2 * | 4/2004 | Stachowski et al. | .......... | 318/466 |
| 6,873,892 B2 * | 3/2005 | Katz et al. | ....................... | 701/49 |
| 6,904,383 B2 * | 6/2005 | Tanaka et al. | ................. | 702/169 |
| 7,340,341 B2 * | 3/2008 | Adachi | .......................... | 701/208 |
| 2006/0165276 A1 * | 7/2006 | Hong et al. | ................... | 382/153 |

FOREIGN PATENT DOCUMENTS

JP    2003-532577    11/2003

OTHER PUBLICATIONS

U.S. Appl. No. 11/934,975, filed Nov. 5, 2007, Soichiro Hozumi, et al.
U.S. Appl. No. 11/940,664, filed Nov. 15, 2007, Soichiro Hozumi, et al.
U.S. Appl. No. 11/941,410, filed Nov. 16, 2007, Soichiro Hozumi, et al.
U.S. Appl. No. 11/943,316, filed Nov. 20, 2007, Hozumi, et al.
U.S. Appl. No. 12/016,490, filed Jan. 18, 2008, Hozumi, et al.

* cited by examiner

*Primary Examiner* — Jack Keith
*Assistant Examiner* — Adam Tissot
(74) *Attorney, Agent, or Firm* — Oblon, Spivak, McClelland, Maier & Neustadt, L.L.P.

(57) ABSTRACT

A seat apparatus for a vehicle includes a side support portion moved in first and second directions, a driving device moving the side support portion in the first direction and in the second direction, a vehicle location obtaining means for obtaining vehicle location information including a present location of the vehicle, a curve information preliminarily obtaining means for preliminarily obtaining curve information on a map data including a curve starting point located in an area existing a first predetermined distance ahead from the present location of the vehicle, a control starting point determining means for determining a point existing a second predetermined distance closer to the vehicle than the curve starting point as a control starting point, a control starting point memorizing means for memorizing the control starting point, and a drive control means for starting control on the driving device when the vehicle reaches the control starting point.

11 Claims, 6 Drawing Sheets

SEAT APPARATUS FOR VEHICLE

CROSS REFERENCE TO RELATED APPLICATIONS

This application is based on and claims priority under 35 U.S.C. §119 to Japanese Patent Application 2006-327454, filed on Dec. 4, 2006, the entire content of which are incorporated herein by reference.

FIELD OF THE INVENTION

The present invention relates to a seat apparatus for a vehicle that controls a side support portion.

BACKGROUND

A seat apparatus disclosed in JP 2003532577A is well known. Estimated lateral acceleration, which is supposed to be applied to an occupant seated on a seat when a vehicle is driven on a curve portion of a road, is estimated a relatively large distance before the vehicle is actually driven on the curve portion based on data of a current driving route obtained from a memorized road map and a current vehicle data which is projected onto the driving route. The estimated lateral acceleration is transmitted to a control unit and then to a processing block via a prediction filter, taking into account a filling pressure-related delay time of an adaptation system which is inherent in the system and an instantaneous vehicle speed which is outputted by a sensor. A CUP transmits a corresponding electrical control signal to a pressure regulating device which changes the filling pressure of right air cushions of a seat cushion and a seat back or left air cushions of the seat cushion and the seat back. Thus, when the vehicle is driven on the curve portion of the road, a pre-setting of the seat for lateral support is already completed, and the acceleration sensor is used only for adjusting the pre-setting of the seat in detail by using minimum inflation or venting of the air cushions provided at the right and the left of each of the seat cushion and the seat back.

Hence, the seat apparatus disclosed in JP 2003532577A preliminarily implements seat setting when adaptation of seat support for supporting the seated occupant is required, for example, when the vehicle is driven on the curve portion of the road, so that necessary changes of the seat setting are already completed when the adaptation of the seat support is started. In this way, delay time, inherent in any adaptation system, between actuation of the adaptation system and changing of the seat is offset.

In the seat apparatus disclosed in JP2003532577A, the seat setting for supporting the seated occupant from the lateral acceleration is completed so as to offset delay time between actuation of the adaptation system and changing of the seat, while the vehicle is driven on the curve portion of the road. However, the seat apparatus disclosed in JP2003532577A does not control to offset an error caused due to information on the curve portion and current location of the vehicle.

Additionally, in the seat apparatus disclosed in JP2003532577A, compressed air is adopted as a driving source for moving a side support of the seat. However, when an electric motor, whose responsiveness to drive the side support is quicker than responsiveness of the air-type driving source, is adopted as the driving source, a need may exists to offset the error occurred due to the information on the vehicle location and the curve.

A need exists for a seat apparatus which is not susceptible to the drawback mentioned above.

SUMMARY OF THE INVENTION

According to an aspect of the present invention, a seat apparatus for a vehicle includes a side support portion provided at a seat for a vehicle and moved in a first direction and in a second direction, a driving device moving the side support portion in the first direction and in the second direction, a vehicle location obtaining means for obtaining vehicle location information including a present location of the vehicle, a curve information preliminarily obtaining means for preliminarily obtaining curve information on a map data including a curve starting point located in an area existing a first predetermined distance ahead from the present location of the vehicle in a vehicle moving direction, a control starting point determining means for determining a point existing a second predetermined distance closer to the vehicle than the curve starting point as a control starting point, the second predetermined distance is shorter than the first predetermined distance, and the second predetermined distance is set on the basis of one of a distance error of the vehicle location information and a distance error of the curve starting point on the map data, a control starting point memorizing means for memorizing the control starting point determined by the control starting point determining means, and a drive control means for starting control on the driving device in order to move the side support potion in the second direction when the vehicle reaches the control starting point memorized by the control starting point memorizing means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
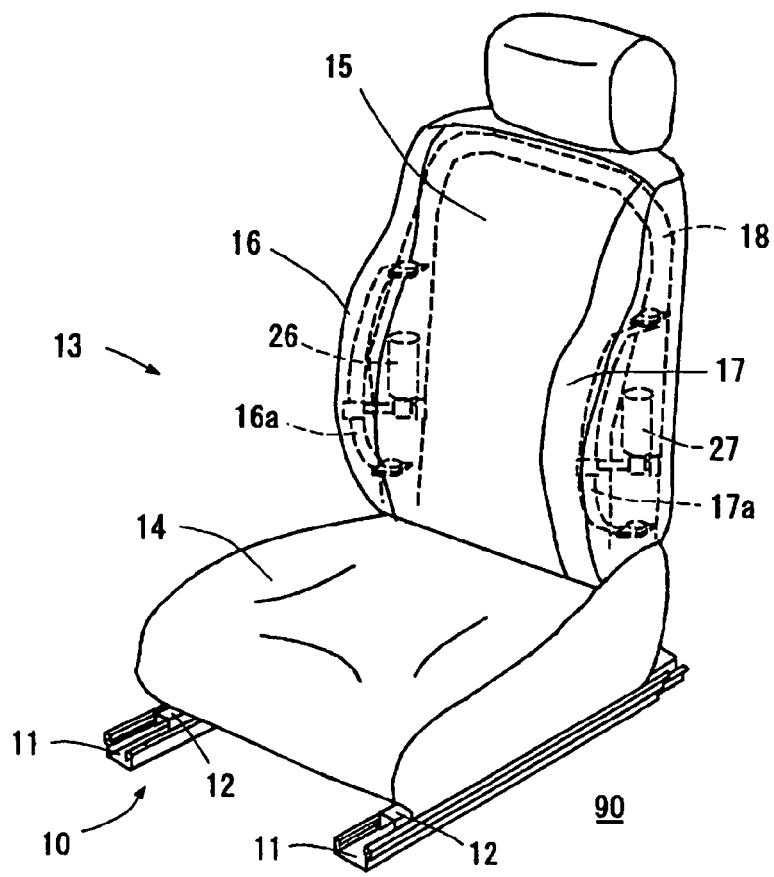
FIG. 1 is a perspective view of a seat apparatus for a vehicle.
Figure 2:
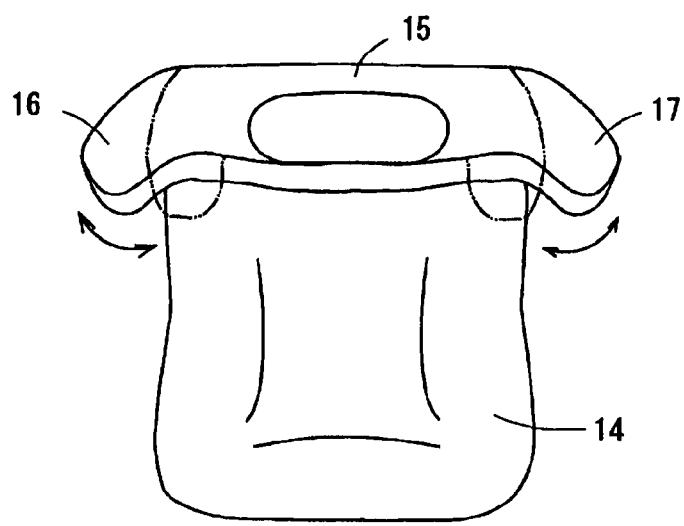
FIG. 2 is a plan view of the seat apparatus for the vehicle.
Figure 3:
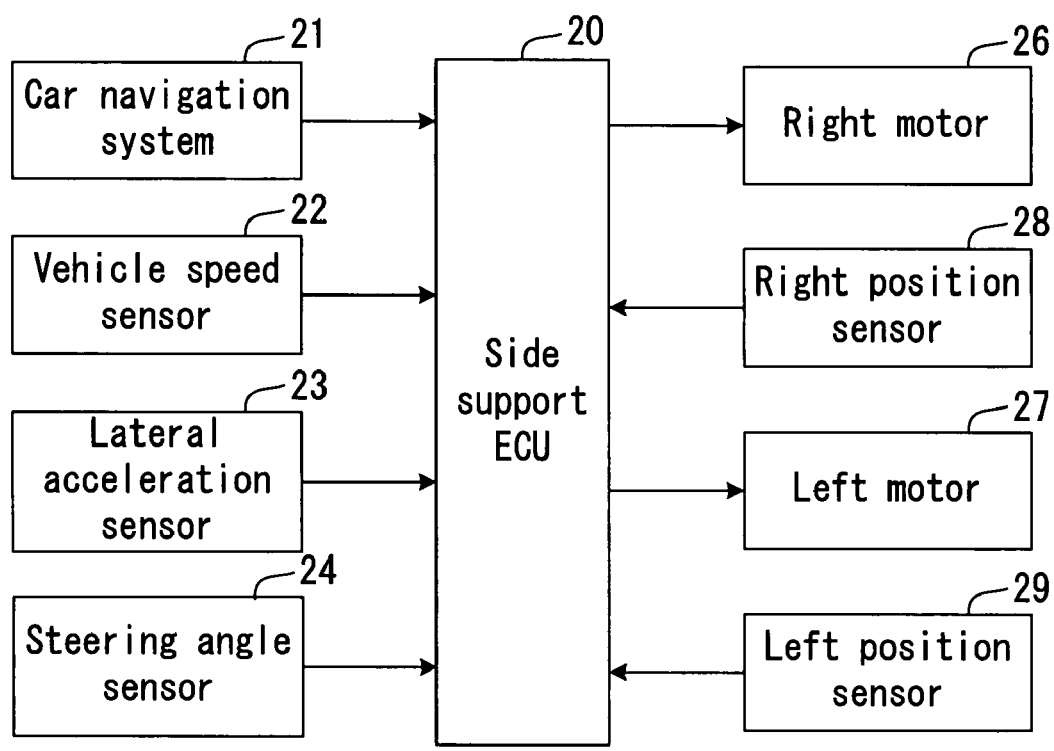
FIG. 3 is a block diagram illustrating an electric connection of the seat apparatus.

An embodiment of a seat apparatus for a vehicle related to the present invention will be described below in accordance with attached drawings. Hereinafter, the seat apparatus for the vehicle is referred to as a seat apparatus. FIG. 1 is a perspective view illustrating a seat sliding device 10 and a seat 13 that configure the seat apparatus. FIG. 2 is a top view of the seat 13, and FIG. 3 is a block diagram illustrating an electric connection of the seat apparatus.

The seat apparatus includes the seat sliding device 10, the seat 13, a side support electronic control unit 20 (hereinafter referred to as a side support ECU 20), a right motor 26, a left motor 27, a right support position sensor 28, and a left support position sensor 29.

The seat slide device 10 includes, for example, a part of lower rails 11 and a pair of upper rails 12 supported by the lower rails 11 so as to be slidable thereon. The lower rails are fixed on a floor 90 so as to extend in a front-rear direction of the vehicle.

The seat 13 includes a seat cushion 14 on which an occupant is seated, and a seat back 15 that supports the occupant's back. Further, a right side support portion 16 and a left side support portion 17 are provided at a right and a left portions of the seat back 15 respectively for stabilizing a posture of the occupant by pressing the upper body of the occupant from the both sides thereof. Additionally, the right motor 26 and the left motor 27 are provided at a right and a left portions of a seat frame 18 respectively. Each of the right and the left motors 26 and 27 includes reduction mechanism. Furthermore, a right support frame 16a and a left support frame 17a are provide at the seat flame 18 so as to be pivoted by means of the right and the left motors 26 and 27 respectively. Both right and left support frames 16a and 17a are pivoted by the both right and left motors 26 and 27 being driven so that both right and left side support portions 16 and 17 are moved in an opened position, which is indicated with a solid line, and in a closed position, which is indicated with a chain double-dashed line illustrated in FIG. 2, for supporting the upper body of the occupant. Additionally, each of the right and the left motors 26 and 27 includes a deceleration mechanism. Hence, the right and the left side support portions 16 and 17 are fixed at a position where movements of the right and the left side support portions 16 and 17 are stopped by cutting off the power feed to the right and the left motors 26 and 27.

When the right and the left side support portions 16 and 17 are opened, the right and the left side support portions 16 and 17 are pivoted outwardly so as to be moved away from each other (first direction). When the right and the left side support portions 16 and 17 are closed, the right and the left side support portions 16 and 17 are pivoted inwardly so as to move closer to each other (second direction). In addition, the right side support portion 16 and the left side support portion 17 each serves as a side support portion. The right motor 26 and a left motor 27 each serves as a driving device.

A vehicle speed sensor 22, a lateral acceleration sensor 23 and a steering angle sensor 24 are connected to a side support electronic control unit 20 (hereinafter referred to as a side support ECU 20). A detecting signal detected by each of the vehicle speed sensor 22, the lateral acceleration sensor 23 and a steering angle sensor 24 is inputted to the side support ECU 20. The vehicle speed sensor 22 detects vehicle speed. The lateral acceleration sensor 23 detects acceleration of the vehicle in a lateral direction (in a horizontal direction, in a vehicle width direction), that is to say, lateral acceleration. The steering angle sensor 24 detects steering angle.

Additionally, a car navigation system 21 is connected to the side support ECU 20. Information such as location of a vehicle (vehicle location information) and a map data are successively inputted to the side support ECU 20 from the car navigation system 21. The vehicle location information includes a present location of a vehicle being controlled (hereinafter, referred to simply as a vehicle). The map data includes curve information that includes, at least, a curve starting point located in an area a first predetermined distance (for example, 150 meters) ahead from the present location of the vehicle in a moving direction of the vehicle (a vehicle moving direction).

Additionally, the map data contains node coordinates indicating intersections, node data indicating connections between nodes, and link data of links indicating that a road exists between the nodes. The node data includes coordinates, connection nodes, angles between the connected nodes, and the like. The link data includes nodes at a starting point and an ending point of a road and/or a curve, length of the link and the like. Additionally, when the road described by the car navigation system 21 is curved, complementing point are provided on the map data, so that the map data corresponds to the road shape by using an arc formed on the basis of the complementing point or by using short lines connecting the complementing point in order to reduce an error between the actual road shape and the map created by the map data.

Furthermore, the right motor 26, the left motor 27, a right rotary encoder functioning the right support position sensor 28 and a left rotary encoder functioning as the left support position sensor 29 are connected to the side support ECU 20. The side support ECU 20 outputs driving signals to the right and the left motor 26 and 27. Further, the right and the left support position sensors 28 and 29 provided at the right and the left motors 26 and 27 respectively, output location signals (hereinafter referred to as feedback signals) to the side support ECU 20 for successively feeding back positions of the right and the left side support portions 16 and 17 to the side support ECU 20 until the right and the left side support portions 16 and 17 are retained at a target closed position.

Figure 7:
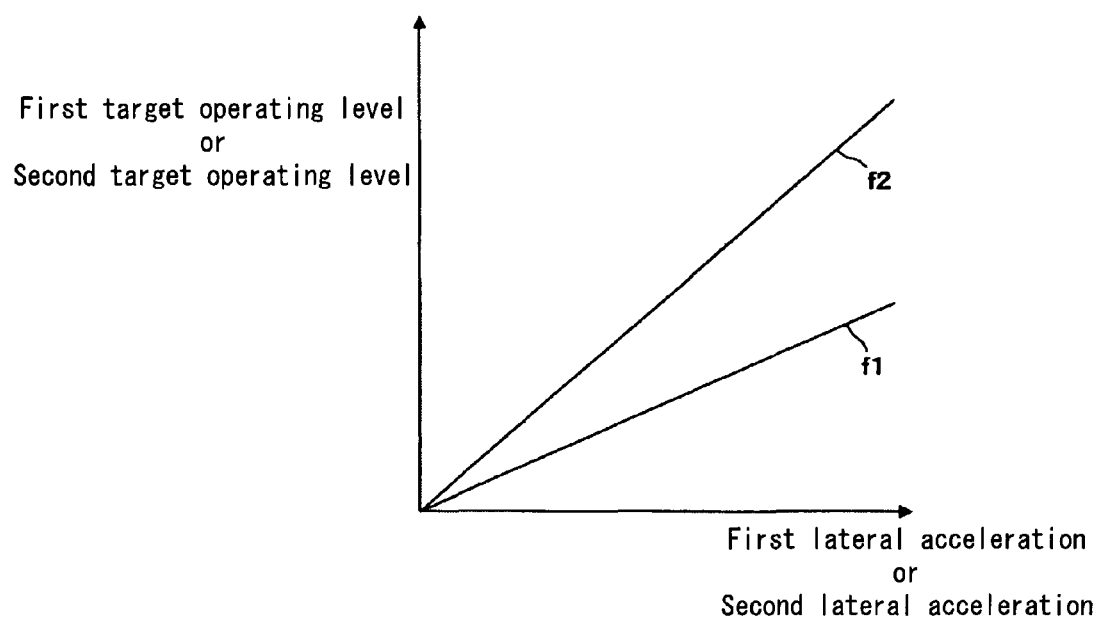
FIG. 7 is a diagram illustrating a correlation between a first lateral acceleration and a first target operating level, and a correlation between a second lateral acceleration and a second target operating level.

The side support ECU 20 includes a microcomputer (not shown). Specifically, the microcomputer includes an input-output interface, a CPU, a RAM and a ROM, which are connected to each other via buses (all of which are not shown). The CPU executes programs described in flowcharts of FIGS. 4, 7 and 8 in order to execute a opening and closing control on the right and the left side support portions 16 and 17 of the seat 13. The RAM temporarily memorizes variables number necessary for executing the programs. The ROM memorizes the above-mentioned programs.

An operation of the seat apparatus having the above-mentioned configuration will be described below in accordance with flowcharts described in FIGS. 4 and 5. The side support ECU 20 repeatedly executes program corresponding to the flowchart described in FIG. 4 every predetermined short time when an ignition switch (not shown) of a vehicle (not shown) is turned on. Each time when the program is executed in Step 100, the side support ECU 20 obtains the vehicle location information including the present location of the vehicle in Step 101 (a vehicle location obtaining means). Then the side support ECU 20 obtains road information of an area existing the first predetermined distance ahead from the vehicle in the vehicle moving direction from the car navigation system 21 in Step 102 (a curve information preliminarily obtaining means).

The side support ECU 20 determines "NO" in Step 104 when the obtained road information is not related to the curve information, and then the side support ECU 20 proceeds to Step 114. On the other hand, the side support ECU 20 determines "YES" in Step 104 when the road information is related to the curve information, and then the side support ECU 20 proceeds to Step 106. In Step 106, the side support ECU 20 calculates a control starting point, at which the side support ECU 20 starts preparatory support control, on the basis of the obtained road information. Further, the side support ECU 20 calculates a supporting level of the preparatory support control in Step 106. Then, the side support ECU 20 memorizes the calculated control starting point and the supporting level.

The side support ECU 20 determines the control starting point in Step 106 (a control starting point determining means). The control starting point is a point existing a second predetermined distance closer to the vehicle than the curve starting point. The second predetermined distance is calculated on the basis of either error on the vehicle location information or error on the curve starting point on the map data.

The location of the vehicle is measured by using either a sensor system or by a satellite system. In the sensor system, the present location of the vehicle is measured by calculating a driven distance and an azimuth from a departure point on a driving route on which the vehicle is driven by means of a sensor provided at the vehicle. In the satellite system, the location of the vehicle is measured by, for example, using a global positioning system (GPS) that utilizes electric waves transmitted from satellites. Recently, the vehicle location is measured by combining the sensor system and the satellite system in order to improve accuracy in measuring the vehicle location. Measurement error occurs when the vehicle location is measured either by the sensor system or the satellite system. Hence, even a satellite system, whose measurement generates a relatively small error, is used to measure the vehicle location, the vehicle location information includes a distance error of several tens of meters, for example, in this embodiment, approximately 40 meters of the distance error is added to the satellite system. This is because the GPS has a limited measurement resolution, and there are time lags between the time when the electric wave transmitted from each of the satellites reaches the vehicle.

Additionally, the curve starting point included in the curve information also includes a distance error of several tens of meters, for example, in this embodiment approximately 40 meters of the distance error is added to the curve starting point. The car navigation system 21 forms an arc, which indicate the curve portion of a road, running close continuous point exist along a route on the electronic map data, and similarly the car navigation system 21 forms a straight line that indicates a straight portion of the road by supplying a complementing point if necessary. When the curve starting point corresponds to the complementing point, the distance error does not occur. However, when the curve starting point does not correspond to the complementing point, the car navigation system 21 calculates the curve starting point and a radius of the curve from several complementing points, for example four complementing points, existing around a border between the straight portion and the curve portion of the road. When the straight portion has more complementing portions than the curve portion, the calculated curve radius becomes large. On the other hand, when the curve starting portion has more complementing portions than the straight portion, the calculated curve radius becomes smaller, and the car navigation system 21 may not accurately determine the curve starting point.

Figure 6:
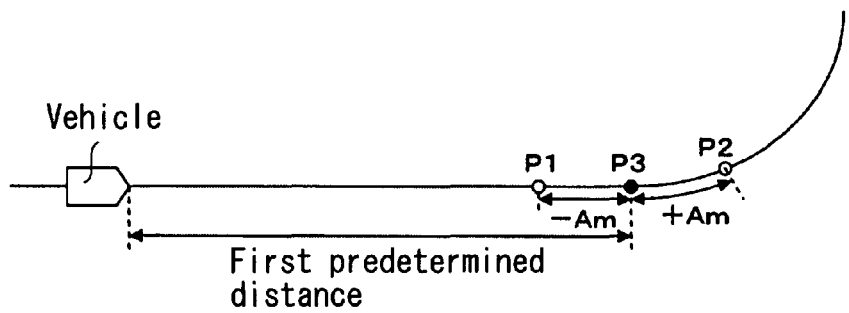
FIG. 6 is a diagram for explaining a distance error of a curve starting point and an actual curve starting point.

As mentioned above, each of the vehicle location and the curve starting point may include the distance error. For example, when the vehicle location does not include the distance error, but the curve starting point includes the distance error of ±A meters, the car navigation system 21 does not accurately determine the curve starting point, because the complementing points are irregularly dispersed in a range between P1 and P2, as illustrated in FIG. 6. P1 is a point on the straight portion of the road, and further, P1 exists closer to the vehicle than the actual curve starting point P3. P2 is a point on the curve portion of the road, and further, P2 exists beyond the actual curve starting point P3 in the vehicle moving direction. In a case where the preparatory support control is executed when the vehicle reaches P1, the preparatory support control is executed before the vehicle is driven on the curve, in other words, the right and the left side support portions 16 and 17 are actuated to support the occupant before the vehicle is driven on the curve. However, in a case where the preparatory support control is started when the vehicle reaches P2, the preparatory support control is not executed before the vehicle reaches the actual curve starting point P3, but the preparatory support control is executed after the vehicle passes the actual curve starting point P3 and then a main support control is executed. The main support control is executed while the vehicle is being driven on the curve, and further, the controlling level of the right and the left side support portions 16 and 17 for the main support control is determined, for example, on the basis of the lateral acceleration. Hence, when the car navigation system 21 determines P2 as the curve starting point, the side support ECU 20 does not follow a proper order of control on the right and the left side support portions 16 and 17, but the side support ECU 20 executes control in a reverse order.

Hence, the second predetermined distance may be set to correspond a distance that is calculated by adding a distance error A of the curve starting point to a predetermined distance so that the side support ECU 20 executes support control on the right and the left side support portions 16 and 17 in the proper order. The preparatory support control is started the predetermined distance before the actual curve starting point when the vehicle location and/or the curve starting point do not include the distance error. Hence, when the car navigation system 21 determines P2 as the curve starting point on the map data, the preparatory support control is surely executed at least the predetermined distance before the actual curve starting point. However, when the car navigation system 21 determines P1 as the curve starting point on the map data, the preparatory support control is executed a distance corresponding to sum of the distance error A and the predetermined distance before the actual curve starting point. In other words, when the car navigation system 21 determines P1 as the curve starting point, the preparatory support control is executed well before the vehicle reaches the actual curve starting point P3.

Additionally, in a case where the curve starting point does not include the distance error, but the vehicle location includes the distance error of ±B meters, the second predetermined distance may be set so as to correspond to a distance that is calculated by adding a distance error B of the vehicle location to the predetermined distance so that the side support ECU 20 executes the support control on the right and the left side support portions 16 and 17 in the proper order.

Furthermore, in a case where the curve starting point includes the distance error of ±A meters, and the vehicle location includes the distance error ±B meters, the predetermined distance may be set by taking into account an error based on both of the distance error A of the curve starting point and the distance error B of the vehicle location. In this case, the second predetermined distance error is calculated by a formula 1.

Formula 1:

$$\text{Second predetermined distance} = \sqrt{A^2+B^2} + \text{predetermined distance}$$

For example, in a case where the curve starting point includes the distance error A of 40 meters, and the vehicle location includes the distance error B of 40 meters, the predetermined distance is calculated as a sum of approximately 56 meters and the predetermined distance according to the formula 1.

In Step 108, the side support ECU 20 obtains information on the vehicle speed detected by the vehicle speed sensor 22 at a time when the side support EUC 20 obtained the curve information. Further, in Step 108, the side support ECU 20 calculates a first lateral acceleration on the curve that exists in the area existing the first predetermined distance ahead from the vehicle in the vehicle moving direction on the basis of the vehicle speed detected by the vehicle speed sensor 22 when the side support ECU 20 obtains the information on the curve radius and the curve information. In other words, the side support ECU 20 calculates the first lateral acceleration on the curve on the basis of the vehicle speed detected by the vehicle speed sensor 22 when the vehicle reaches the control starting point. Hence, the first lateral acceleration is a lateral acceleration of the vehicle calculated not on the basis of a running condition of the vehicle, but on the basis of the road information. The first lateral acceleration is calculated by a formula: (vehicle speed)$^2$/(curve radius).

In Step 110, the side support ECU 20 calculates a first target operating level of the right and the left motors 26 and 27 on the basis of correlation between the first lateral acceleration calculated in Step 108, a preliminarily memorized first lateral acceleration and a preliminarily memorized first target operating level (a first target operating level calculating means). The correlation between the first lateral acceleration and the first target operating level is, as illustrated by a function f1 in FIG. 7, in direct proportion to each other so that the operating level increases in proportion to the lateral acceleration. Value of the function f1 is set so that a slope of the function f1 lower than a slope of a function f2 that will be described below. The first target operating level is a target operating level of the right and the left motors 26 and 27 when the preparatory support control is executed. A second target operating level is a target operating level of the right and the left motors 26 and 27 when the main support control is executed. Operating level of the right and the left motors 26 and 27 when the preparatory support control is executed may be set to be lower than operating level of the right and the left motors 26 and 27 when the main support control is executed. When the first operating level of the right and the left motors 26 and 27 that corresponds to a closing level of the right and the left side support portions 16 and 17 is larger than the second operating level of the right and the left motors 26 and 27 while the vehicle is driven on the curve, the seated occupant my feel uncomfortable. Hence, the first target operating level is set to be lower than the second target operating level in this embodiment.

In Step 112, the side support ECU 20 correlates the control starting point determined in Step 106 and the first target operating level calculated in Step 110. Further, the side support ECU 20 stores the control starting point and the first operating level at the memory device (a control starting point memorizing means). Then, the side support ECU 20 proceeds to Step 114.

Figure 5:
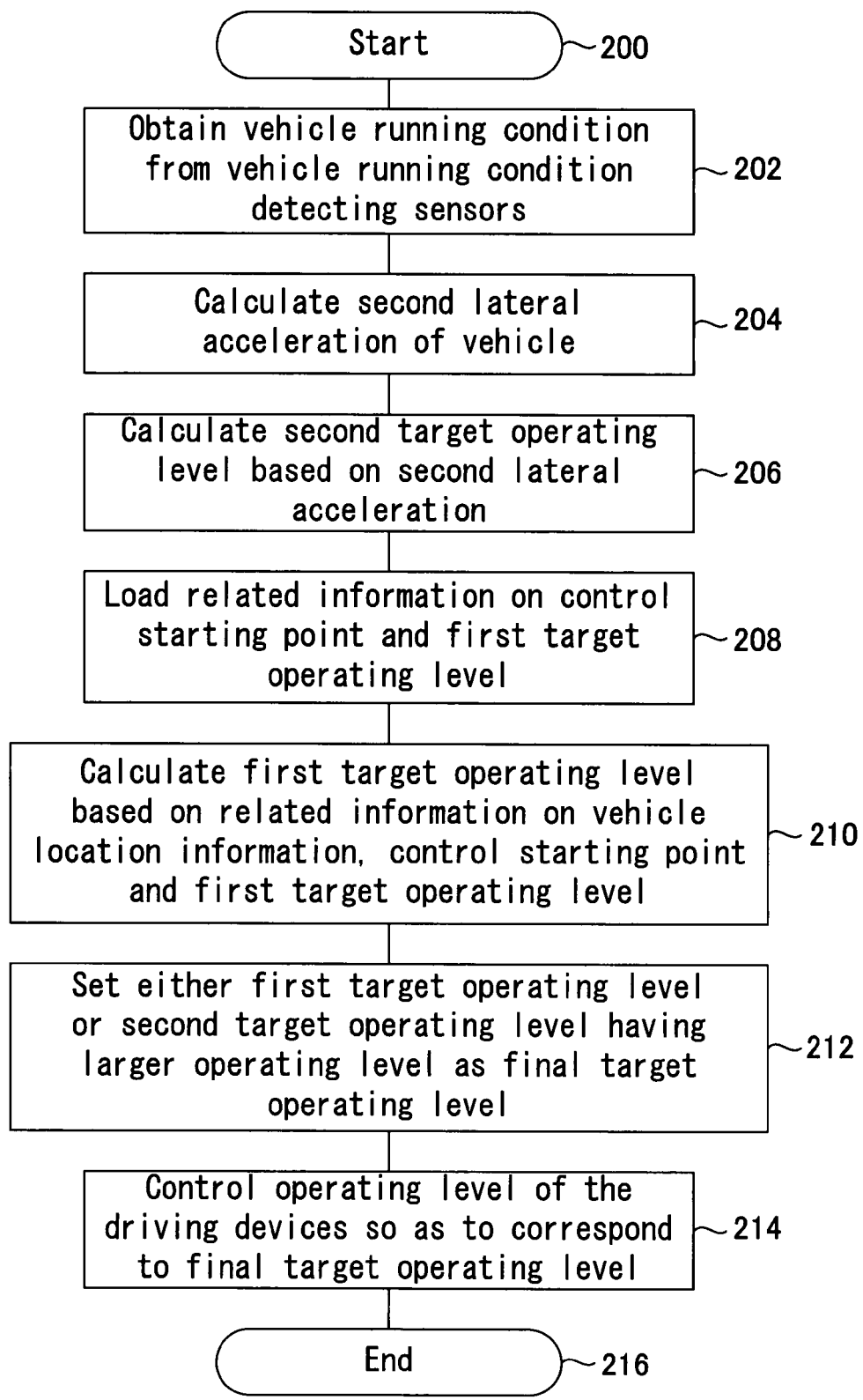
FIG. 5 is a flowchart describing a control program executed at the side support ECU.

In additions to the above-mentioned program from Step 100 to Step 114, the side support ECU 20 executes a program described in the flowchart of FIG. 5 in order to control the right and the left motors 27 and 27 and then move the right and the left side support portions 16 and 17 of the seat 13 either to the opened position or to the closed position.

Figure 4:
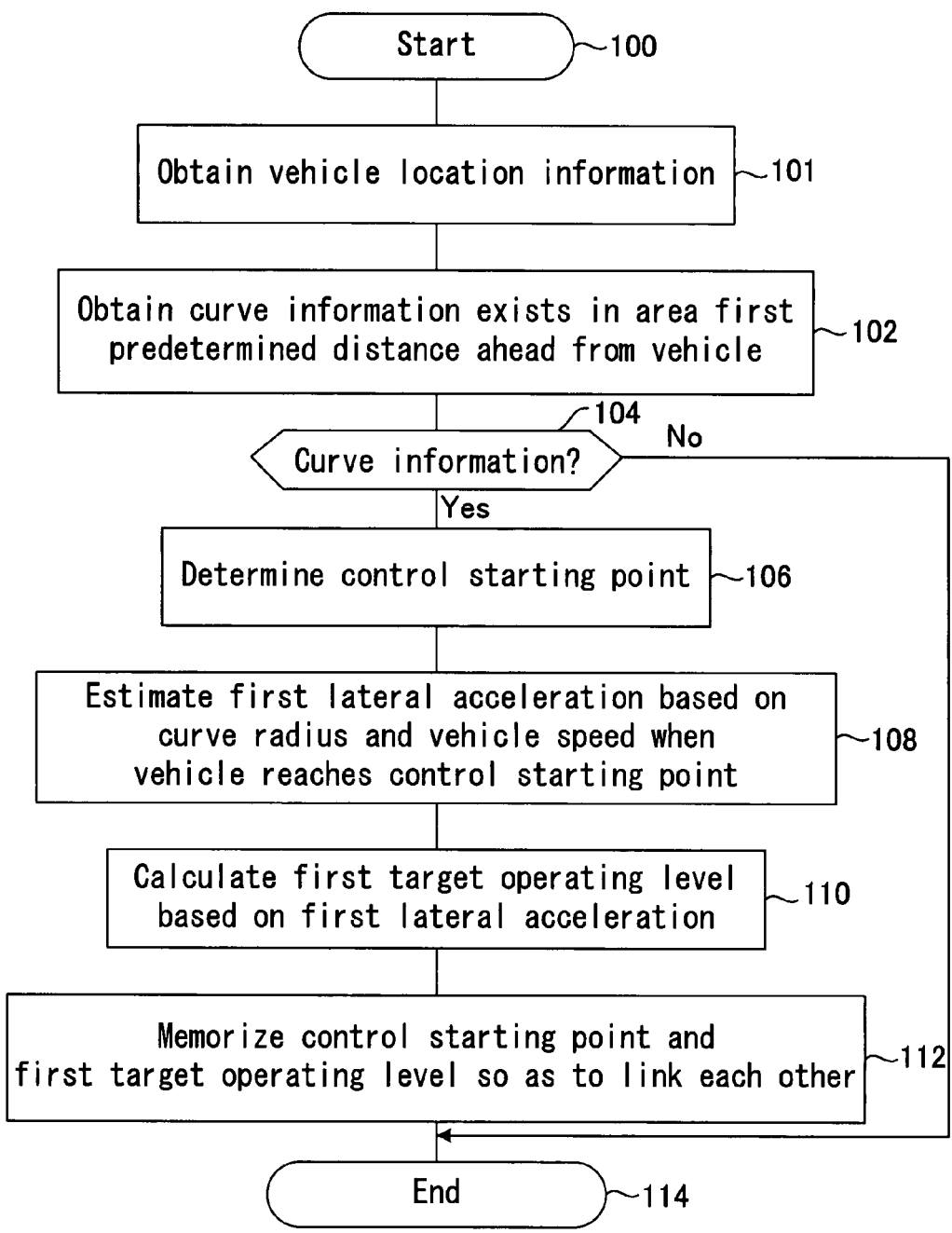
FIG. 4 is a flowchart describing a control program executed at a side support ECU.

Specifically, the side support ECU 20 repeatedly executes the program corresponding to the flowchart described in FIG. 4 every predetermined short time when the ignition switch (not shown) of the vehicle (not shown) is turned on.

The side support ECU 20 obtains the vehicle running condition from vehicle running condition detecting sensors in Step 202 (a vehicle running condition obtaining means. The vehicle running condition indicates the vehicle speed, the lateral acceleration of the vehicle and the steering angle of the vehicle. The vehicle running condition detecting sensors indicates the vehicle speed sensor 2, the lateral acceleration sensor 23 and the steering angle sensor 24. Meanwhile, a yaw rate sensor that detects yaw rate of the vehicle may be used instead of the steering angle sensor 24.

The side support ECU 20 calculates the second lateral acceleration of the vehicle on the basis of the detected signals from the lateral acceleration sensor 23 in Step 204. Hence, the second lateral acceleration is a lateral acceleration (a so-called actual lateral acceleration) of the vehicle calculated on the basis not of the road information, but on the basis of the vehicle running condition. Additionally, the second lateral acceleration may be calculated in a manner where firstly the side support ECU 20 calculates the vehicle speed and the steering angle from the detected signals of the vehicle speed sensor 22 and the steering angle sensor 24 and then the side support ECU 20 calculates the second lateral acceleration on the basis of the vehicle speed, the steering angle of the vehicle and a formula 2.

$$\text{Second lateral acceleration} = \frac{V^2 * S_T}{(1 - A \cdot V^2) * B} \qquad \text{Formula 2}$$

The second lateral acceleration may be calculated on the basis of the vehicle speed, the steering angle of the vehicle and the formula 2 where V is the vehicle speed, $S_T$ is the steering angle, A is a stability factor and B is a value calculated by a formula: (wheel base)*(steering gear ratio).

In Step 206, the side support ECU 20 calculates a second target operating level of the right and the left motors 26 and 27 on the basis of correlation between the second lateral acceleration calculated in Step 204, a preliminarily memorized second lateral acceleration and the second target operating level (a second target operating level calculating means). The correlation between the second lateral acceleration and the second target operating level is, as illustrated by the function f2 in FIG. 7, in direct proportion to each other so that the operating level increases in proportion to the lateral acceleration.

The side support ECU 20 includes a memory device (not shown). In Step 208, the side support ECU 20 reads the latest information out of the related information memorized at the memory device. The memory device memorizes the related information of the control starting point and the first target operating level. Then, the side support ECU 20 calculates the first operating level on the basis of the relationship between the vehicle location and the control starting point in Step 210. Hence, when the vehicle reaches the control starting point that is calculated by the side support ECU 20 in Step 106, the side support ECU 20 determines a first target operating level related to the control starting point as the first target operating level. The first target operating level is zero until the vehicle reaches the control starting point.

In Step 212, the side support ECU 20 compares the first target operating level calculated in Step 208 and the second target operating level calculated in Step 206, then the side support ECU 20 determines either the first target operating level or the second target operating level that has a larger operating level as a final target operating level (a final target operating level determining means). Additionally, in a case where the vehicle passes the curve starting point and the second lateral acceleration is equal to or more than the predetermined value, the related information of the latest control starting point that the vehicle passed and the first target operating level are cleared after the side support ECU 20 executes the process in Step 212. Then, the side support ECU 20 controls the right and the left motors 26 and 27 so that the driving devices are controlled in accordance with the determined final target operating level in Step 214 (a drive control means). Then, the side support ECU 20 proceeds to Step 216.

Figure 8:
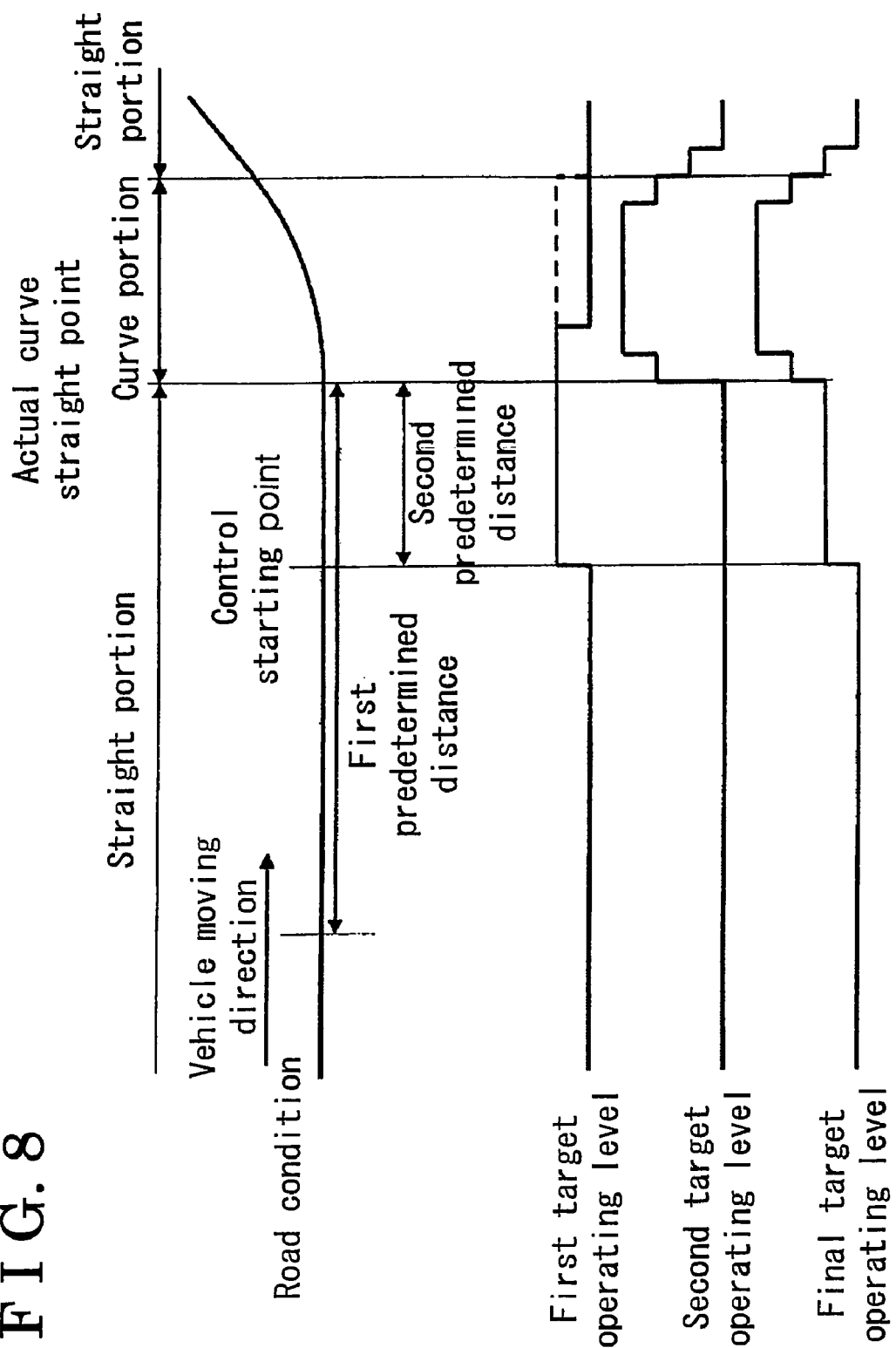
FIG. 8 is a diagram illustrating a relationship between a road shape, the first target operating level, the second target operating level and a final target operating level.

A controlling operation executed by the side support ECU 20 will be described below in accordance with a case where the vehicle is driven on a road illustrated in FIG. 8 from the left to the right. As illustrated in FIG. 8, the road is integrally formed with two straight portions and a curve. More specifically, the vehicle is driven on the road having a curve between the two straight portions. The vehicle is assumed to be driven firstly on the straight portion illustrated in the left in FIG. 8, secondly on the curve, and then the straight portion illustrated in the right in FIG. 8. Further, the curve starting point on the map data is assumed to correspond to the actual curve starting point.

When the vehicle reaches a point the first predetermined distance before the actual curve starting point, the side support ECU 20 obtains the road information (the curve information) in Step 102, then the side support ECU 20 calculates the control starting point and the first target operating level from Step 106 to Step 110. The side support ECU 20 memorizes the calculated control starting point and the calculated first target operating level in step 112. The calculated control starting point is calculated so as to correspond to a point the second predetermined distance closer to the vehicle than the actual curve starting point.

When the vehicle is further driven in the vehicle moving direction and reaches the memorized control starting point, the side support ECU 20 starts controlling the right and the left motors 26 and 27 in order to move the right and the left side support portions 16 and 17 to the closed position, and then, the side support ECU 20 controls the operating level of the right and the left motors 26 and 27 so as to correspond to the first target controlling level in Step 214 (the preparatory support control). The side support ECU 20 determines that the control starting point is located on the straight portion, not on the curve. Therefore, when the vehicle reaches the control starting point, the actual lateral acceleration is not generated at the vehicle. Hence, the second target operating level is set to zero.

Then, when the vehicle is further driven in the vehicle moving direction and reaches the actual curve starting point, the side support ECU 20 calculates the lateral acceleration of the vehicle on the basis of the signals transmitted from the lateral acceleration sensor 23 (the vehicle running condition detecting sensor) in Step 204, then the side support ECU 20 calculates the second target operating level from the lateral acceleration in Step 206. Further, the side support ECU 20 reads the related information of the preliminarily calculated and memorized control starting point and the preliminarily calculated and memorized first target operating level in Step 208, then the side support ECU 20 calculates the first target operating level on the basis of the related information and the vehicle location information in Step 210. Further, the side support ECU 20 compares the calculated first target operating level and the calculated second target operating level in order to determine the final target operating level in Step 212. Finally, the side support ECU 20 drives the right and the left motors 26 and 27 so that the operating level of the right and the left motors 26 and 27 corresponds to the final target operating level in Step 214 (the main support control).

When the side support ECU 20 executes the main support control, the side support ECU 20 controls the right and the left side support portions 16 and 17 to be at the opened position or at the closed position on the basis of the lateral acceleration that is actually generated at the vehicle when the vehicle is driven on the curve. When the side support ECU 20 executes the preparatory support control, the sides support ECU 20 controls the right and the left side support portions 16 and 17 to be at the opened position or at the closed position on the basis of the lateral acceleration estimated on the basis of the curve information, but not on the basis of the lateral acceleration actually generated just before the vehicle is driven on the curve.

According to the embodiment, at least one of the distance error of the vehicle location information and the distance error of the curve starting point is offset. As a result, the right and the left side support portions 16 and 17 are surely controlled to be at the closed position before the vehicle is driven on the curve.

Additionally, the curve information obtained by the curve information preliminarily obtaining means includes the information on the curve radius, the first target operating level calculating means (Step 110) calculates the first target operating level of the driving devices 26 and 27 on the basis of the curve radius included in the curve information and the vehicle speed detected by the vehicle speed sensor 22 when the vehicle reaches the control starting point. Then, the drive control means (Step 214) starts controlling the driving devices 26 and 27 in order to move the right and the left side support portions 16 and 17 to the closed position when the vehicle reaches the control starting point, and then, the drive control means drives the driving devices 26 and 27 so that the operating level of the driving devices 26 and 27 corresponds to the first target operating level. Hence, according to the embodiment, the lateral acceleration generated when the vehicle is driven on the curve is estimated on the basis of the road information, and the closing level of the right and the left side support portions 16 and 17 are controlled so as to appropriately correspond to the estimated lateral acceleration.

Further, the vehicle running condition detecting means (Step 202) detects the running condition of the vehicle from the vehicle running condition detecting sensors (the lateral acceleration sensor 23) that detects the running condition of the vehicle. Then, the second target operating level calculating means (Step 206) calculates the second target operating level on the basis of the obtained vehicle running condition. Further, the final target operating level determining means (Step 212) determines either the first target operating level or the second target operating level that has a larger operating level as the final target operating level. Then, the drive control means (Step 214) drives the driving devices 26 and 27 so that the operating level of the driving devices 26 and 27 corresponds to the final target operating level. Hence, according to the embodiment, the side support ECU 20 appropriately selects either the first target operating level that is estimated on the basis of the road information or the second target operating level that is calculated on the basis of the vehicle information depending on situations. As a result, the side support ECU 20 appropriately controls the right and the left side support portions 16 and 17.

In the above-mentioned embodiment, the drive control means (Step 214) may start controlling the driving devices 26 and 27 in order to move the right and the left side support portions 16 and 17 when the vehicle reaches the control starting point, and then the drive control means (Step 214)

may control the driving devices 26 and 27 so that the operating level of the driving devices 26 and 27 corresponds to the first target operating level. Hence, according to the embodiment, the right and the left side support portions 16 and 17 are appropriately prevented from being actuated when the occupant may not need to be supported by means of the right and the left side support portions 16 and 17, for example, when the vehicle is driven on a curve having a large radius.

Additionally, in the above-mentioned embodiment, the control starting means point determining means (Step 106) may determine a point where a time calculated by dividing the distance between the curve starting point and the present location of the vehicle by the present vehicle speed becomes less than a time calculated by dividing the second predetermined distance by an estimated upper limit speed as the control starting point. In this way, the side support ECU 20 appropriately executes control on the driving devices 26 and 27, as is the case with the embodiment. Further, the estimated upper limit speed may be set, for example, to 120 kilometers per hour.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
a side support portion provided at a seat for a vehicle and that moves in a first direction and in a second direction;
a driving device to move the side support portion in the first direction and in the second direction;
a vehicle location obtaining unit that obtains vehicle location information including a present location of the vehicle;
a curve information preliminarily obtaining unit that preliminarily obtains curve information on a map data including a curve starting point located in an area existing a first predetermined distance ahead from the present location of the vehicle in a vehicle moving direction;
a control starting point determining unit that determines a point existing a second predetermined distance closer to the vehicle than the curve starting point as a control starting point, the second predetermined distance is shorter than the first predetermined distance, and the second predetermined distance is set on the basis of at least one of a distance error of the vehicle location information and a distance error of the curve starting point on the map data;
a control starting point memorizing unit that memorizes the control starting point determined by the control starting point determining unit;
a drive control unit that starts control on the driving device in order to move the side support portion in the second direction when the vehicle reaches the control starting point memorized by the control starting point memorizing unit;
a vehicle running condition obtaining unit that obtains a vehicle running condition from a vehicle running condition detecting sensor;
a first target operating level calculating unit that calculates a first target operating level of the driving device on the basis of the vehicle speed detected when the vehicle reaches the control starting point, wherein the drive control unit starts controlling the driving device in order to move the side support portion in the second direction, the drive control unit drives the driving device so that an operating level of the driving device corresponds to the first target operating level, and the first target operating level is calculated on the basis of a first lateral acceleration, which represents a lateral acceleration of the vehicle obtained on the basis of a road information;
a second target operating level calculating unit that calculates a second target operating level of the driving device on the basis of the obtained vehicle running condition, wherein the second target operating level is calculated on the basis of a second lateral acceleration, which represents a lateral acceleration obtained on the basis of the vehicle running condition; and
a final target operating level determining means for determining one of the first target operating level and the second target operating level that has a larger operating level as a final target operating level,
wherein each of the first target operating level and the second target operating levels is set so as to be in directly proportional to an acceleration speed of the vehicle so that the greater the acceleration speed is, the greater each of the first and second target operating level becomes, and the first target operating level and the second target operating level are set so that a slope of the first target operating level is smaller than a slope of the second target operating level, and the first target operating level is below the second target operating level.

2. The seat apparatus for the vehicle according to claim 1, wherein the first target operating level calculating unit calculates the first target operating level on the basis of a curve radius included in the curve information.

3. The seat apparatus for the vehicle according to claim 2, wherein the drive control unit starts controlling the driving device in order to move the side support portion in the second direction when the vehicle reaches the control starting point under a condition where the curve radius obtained by the curve information preliminarily obtaining unit is smaller than a predetermined curve radius, and then, the drive control unit controls the driving device so that the operating level of the driving device corresponds to the first target operating level.

4. The seat apparatus for the vehicle according to claim 1, wherein the control starting point determining unit determines a point, where a time calculated by dividing a distance between the curve starting point and the present location of the vehicle by the present vehicle speed is below a predetermined time calculated by dividing a second predetermined distance by an estimated upper limit speed, as the control starting point.

5. The seat apparatus for the vehicle according to claim 2, wherein the control starting point determining unit determines a point, where a time calculated by dividing a distance between the curve starting point and the present location of the vehicle by the present vehicle speed is below a predetermined time calculated by dividing a second predetermined distance by an estimated upper limit speed, as the control starting point.

6. The seat apparatus for the vehicle according to claim 3, wherein the control starting point determining unit determines a point, where a time calculated by dividing a distance between the curve starting point and the present location of the vehicle by the present vehicle speed is below a predetermined time calculated by dividing a second predetermined distance by an estimated upper limit speed, as the control starting point.

7. The seat apparatus for the vehicle according to claim 1, wherein the second predetermined distance is set on the basis of both the distance error of the vehicle location information and the distance error of the curve starting point, via the equation second predetermined distance=$\sqrt{(A^2+B^2)}$+first predetermined distance, where A is the distance error of the vehicle location information and B is the distance error of the curve starting point.

8. The seat apparatus for the vehicle according to claim 1, wherein an error on the map data is a value, which is preliminarily determined on the basis of a measurement resolution.

9. The seat apparatus for the vehicle according to claim 8, wherein, in a case where a position of the vehicle does not include an error and the curve starting point includes an error, the second predetermined distance corresponds to the error and a predetermined value.

10. The seat apparatus for the vehicle according to claim 8, wherein, in a case where the curve starting point does not include an error and a position of the vehicle includes an error, the second predetermined distance corresponds to the error of the position of the vehicle and a predetermined value.

11. The seat apparatus for the vehicle according to claim 8, wherein the side support portion is actuated by a motor.

\* \* \* \* \*